US010909033B1

(12) United States Patent
Fang et al.

(10) Patent No.: US 10,909,033 B1
(45) Date of Patent: Feb. 2, 2021

(54) TECHNIQUES FOR EFFICIENTLY PARTITIONING MEMORY

(71) Applicant: NVIDIA Corporation, Santa Clara, CA (US)

(72) Inventors: Kun Fang, San Jose, CA (US); James M. Van Dyke, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 29 days.

(21) Appl. No.: 16/541,417

(22) Filed: Aug. 15, 2019

(51) Int. Cl.
*G06F 12/00* (2006.01)
*G06F 12/06* (2006.01)
*G06F 3/06* (2006.01)

(52) U.S. Cl.
CPC ........ *G06F 12/0692* (2013.01); *G06F 3/0604* (2013.01); *G06F 3/0644* (2013.01); *G06F 3/0673* (2013.01); *G06F 2212/1044* (2013.01)

(58) Field of Classification Search
CPC .. G06F 12/0692; G06F 3/0604; G06F 3/0644; G06F 3/0673; G06F 3/0683; G06F 3/0689; G06F 13/16; G06F 2212/1044
See application file for complete search history.

(56) References Cited

U.S. PATENT DOCUMENTS 6,148,377 A * 11/2000 Carter ................. G06F 12/0813
711/147

* cited by examiner

*Primary Examiner* — Shawn X Gu
(74) *Attorney, Agent, or Firm* — Leydig, Voit & Mayer, Ltd.

(57) ABSTRACT

Techniques are disclosed for allocating a global memory space defined within physical memory devices into strided memory space(s) (SMS) and partition memory space(s) (PMS). In an embodiment, a SMS is mapped across all of the devices, and a PMS is mapped to a subset of the devices to ensure resource isolation between separate PMSs. Typically, a memory space is allocated in unit sizes. When the locations mapped to most of the SMS align to an integer number of the unit size, a common boundary can be formed between the SMS and the one or more PMSs in each of the devices. Such a boundary can advantageously minimize a region of locations that are not available for allocation in the global memory spaces. In an embodiment, when a strided allocation is not an integer number of the unit size, a remainder is mapped to locations for one or more PMSs.

21 Claims, 16 Drawing Sheets

TECHNIQUES FOR EFFICIENTLY PARTITIONING MEMORY

TECHNICAL FIELD

The present disclosure relates to address mapping, and more particularly to address mapping for resource access isolation.

BACKGROUND

A software application stores data in one or more addressable memory spaces allocated to the application. Conventionally, the data is stored in a physical memory associated with a processor. Mapping the addressable memory space to linear physical memory locations requires a conversion operation. The conversion operation may be simplified by constraining a unit size of the physical memory that is allocated for an addressable memory space. The larger the unit size, the easier the conversion operation can be while also ensuring separate addressable memory spaces are exclusive. However, larger unit sizes are more wasteful when the addressable memory spaces are not integer multiples of the unit size. Conventionally, the number of memory devices (in a width dimension) determines a minimum unit size and is often constrained to be a power-of-two to simplify the conversion operation. Constraining the number of memory devices limits the number of possible price and/or performance options for a system. For example, a single processor may be shared by multiple clients (e.g., applications or users). It is necessary to partition memory address space for allocation to the multiple clients such that each client operates independently without affecting workloads of other clients. Therefore, a mapping technique is needed that ensures exclusive addressable memory spaces using an efficient conversion operation without constraining the number of memory devices while minimizing waste. Thus, there is a need for addressing these issues and/or other issues associated with the prior art.

SUMMARY

Memory spaces are allocated that may each be designated as either strided or partition. A strided memory space is mapped across all of the physical memory devices. A partition memory space is mapped to a portion of the physical memory devices to ensure resource isolation between separate partition memory spaces. The memory is allocated in unit sizes. When a strided allocation is not an integer number of the unit size, an amount of the strided memory space is mapped to locations across the physical memory devices and a remainder is mapped to locations for one or more partition memory spaces. Because the locations mapped to most of the strided memory space align to an integer number of the unit size, a common boundary exists between the strided memory space and the one or more partition memory spaces in each of the physical memory devices. The common boundary ensures a buffer region of locations that are not available for allocation to any memory space can be minimized.

A method and system are disclosed for mapping an address to locations in physical memory. An address is received for accessing an address space that is mapped to locations in the physical memory associated with a processor, where the address space is separated into a first portion corresponding to a strided memory space and a second portion corresponding to at least one partition memory space. The address is determined to be within the first portion, where most of the first portion is mapped to a first subset of the locations in the physical memory that are aligned at a first common boundary across devices included in the physical memory, a remainder of the first portion is mapped to a second subset of the locations in the physical memory that are aligned at a second common boundary, and the second portion is mapped to a third subset of the locations in the physical memory that are between the first common boundary and the second common boundary. A first location address in the first subset is computed when the address is within the most of the first portion and a second location address in the second subset is computed when the address is within the remainder of the first portion.

BRIEF DESCRIPTION OF THE DRAWINGS

FIG. 1I illustrates a block diagram of a processor and local memory, in accordance with an embodiment.

DETAILED DESCRIPTION

Figure 1A:
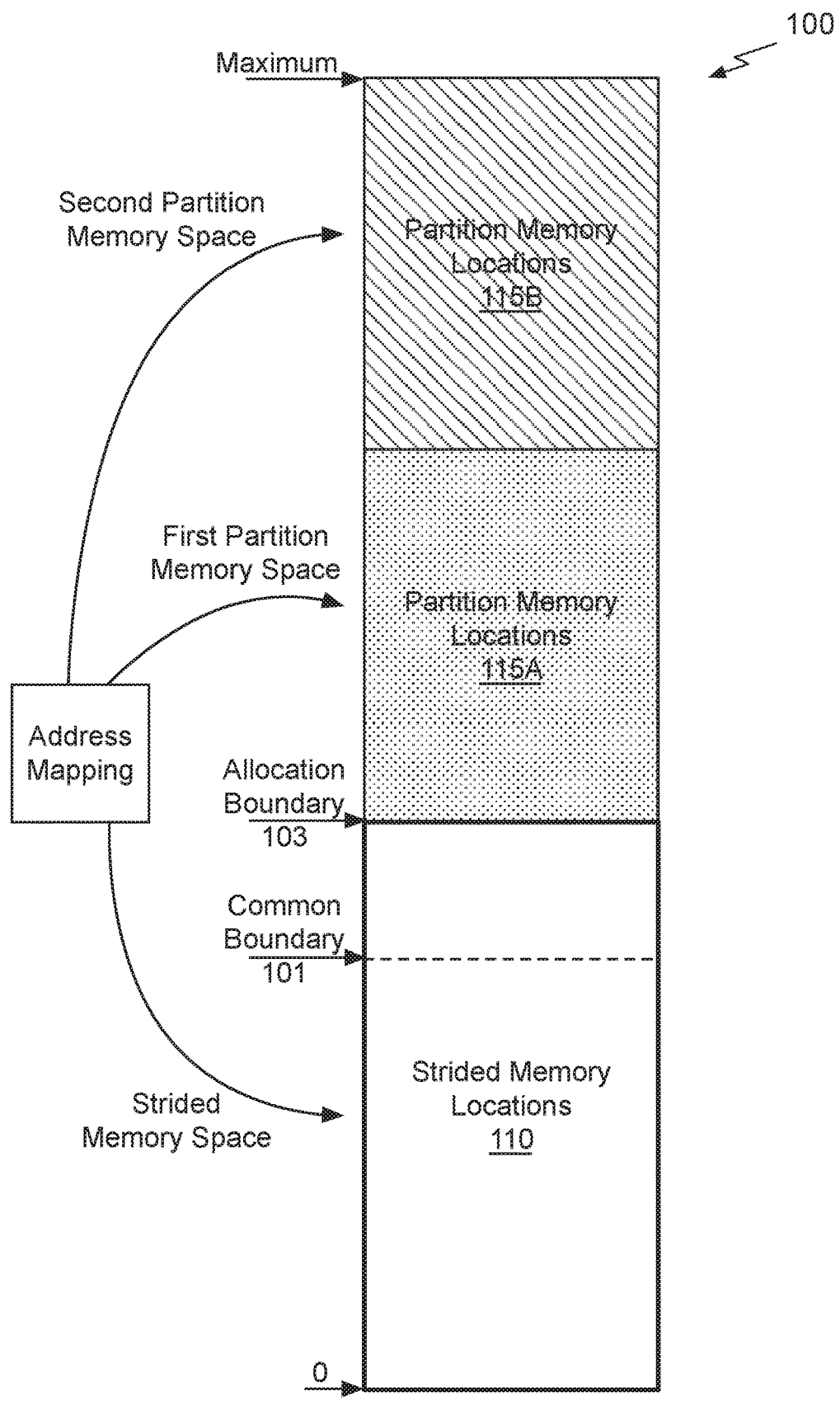
FIG. 1A illustrates a strided memory space and partition memory spaces mapped to locations in local physical memory, in accordance with an embodiment.

A single processor, such as a graphics processing unit (GPU), may be shared by multiple clients (e.g., applications or users). The memory address space associated with the GPU is partitioned into a common system area (referred to as strided memory space) and multiple client areas (referred as partition memory spaces). Hardware resources within the GPU and the memory space should be allocated such that each client operates independently without affecting workloads of other clients. Rather than striding horizontally across all memory resources, including memory devices comprising the memory address space, the memory resources are grouped for allocation to separate clients in a vertical or sliced fashion. Hence, clients only access their assigned memory units and hardware resources.

Unequal memory allocation to clients, and possibly a number of physical memory devices that is not equal to a power-of-two can create address mapping challenges. For example, a number of devices D is a power-of-two when $D=2^i$ and i is an integer. In an embodiment, different address mappings are required for the stride memory space and each partition address space. Unequal consumption of memory between stride and partition memory spaces results in difficult to calculate and unequal address mapping boundaries such that the address between two different memory spaces varies for different physical memory devices (e.g., DRAM) allocated for the two different memory spaces. In an embodiment, hashing randomizes addressing causing more boundary unpredictability.

Partitioning or grouping the memory resources into subregions provides access isolation for the strided memory space and the different partition memory spaces. A technique is described for mapping addresses in the strided memory space and at least one partition memory space to the local physical memory associated with the processor. The strided memory space is distributed across all of the physical memory devices included in the local physical memory that is associated with the processor. Software specifies the size of the strided memory space and the size is not constrained to end at a common or clean boundary.

A clean or common boundary ensures that an equal amount of the strided memory space is provided by each of the memory devices and that no address for the strided memory space will be mapped outside of the strided memory space. For example, N memory pages may be consumed by the strided memory space in each of the memory devices accounting for swizzling (or hashing) of the local physical memory addresses. In the context of the following description, the common boundary occurs at the same location address in each of the physical memory devices, so that a single location address is common across all of the physical memory devices. Importantly, the common boundary should ensure that there will be no aliasing of addresses such that, when a swizzle or hash function specified for the strided memory space is applied to the address during mapping, the local physical memory address corresponds to a memory location for the strided memory space and is not in a partition memory space. Similarly, the common boundary should ensure that, when a swizzle or hash function specified for a partition memory space is applied to the address during mapping, the local physical memory address corresponds to a memory location within the partition memory space and is not in either the strided memory space or another partition memory space.

FIG. 1A illustrates a strided memory space and partition memory spaces mapped to locations in a local physical memory 100, in accordance with an embodiment. Partition memory locations 115A and 115B and strided memory locations 110 are each illustrated as addressable locations that are consumed across the (physical memory) devices included in the local physical memory 100. The specific locations in the physical memory 100 are within a range of local memory addresses.

The strided memory space is mapped to strided memory locations 110 ranging from zero to an allocation boundary 103. The strided memory locations 110, are allocated to store the strided memory space. An amount that comprises Most of the strided memory space is mapped to the strided memory locations 110 ranging from zero to a common boundary 101. A remainder of the strided memory space including locations ranging from the common boundary 101 to the allocation boundary 103.

It is desirable for the strided memory locations 110 mapped to the strided memory space to align to a common (clean) boundary, such as the common boundary 101 for simpler mapping computations. The common boundary is associated with the same location address in each of the devices. For example, when each DRAM device includes 256 MB of addressable memory locations, corresponding to addressable space of 0x0000 0000 to 0x03D0 9000 for 4 byte addressable locations, then the common boundary 101 can be equal to 0x 003D 0900 when the unit size of the physical memory is equal to 16 MB in each memory device.

As shown in FIG. 1A, the locations in the physical memory 100 that are mapped to the strided memory space typically do not align at a common boundary. Furthermore, between the common boundary 101 and the allocation boundary 103 the same number of locations are not consumed in each of the devices for the strided memory space. A common boundary, such as the common boundary 101 results from an allocation of the physical memory 100 that consumes multiples of the unit size of physical memory. The common boundary results when an equal number of locations are allocated in each device for the strided memory space.

One or more of the locations from the common boundary 101 to the allocation boundary 103 may be unused and are unavailable for allocation to either the partition memory space or the strided memory space. Unused locations may be necessary to maintain the common boundary 101 and ensure that strided memory space addresses are not mapped to partition memory space and vice versa. The unused locations and/or a buffer region may be needed when location address bit swizzling or hashing is used to map strided memory space or partition memory space addresses to locations in the physical memory 100 or when the number of devices is not a power-of-two, as described in conjunction with FIGS. 1B and 1C.

A first partition memory space is allocated the partition memory locations 115A between the allocation boundary 103 and a maximum. A second partition memory space is allocated the partition memory locations 115B between the allocation boundary 103 and the maximum. The partition memory spaces may be used for simultaneous multiple contexts, where each context may be associated with a different client. Importantly, each partition memory space is isolated, so that only the context to which the partition memory locations are allocated can access the partition memory locations. Therefore, in contrast with the strided memory space, each partition memory space is mapped to memory locations in a separate portion of the devices instead of being mapped to memory locations across all of the devices. For example, as shown in FIG. 1A, the partition memory locations 115A are allocated in a first half of the devices (the first, second, and third devices) and the partition memory locations 115B are allocated in a second half of the devices (the remaining three devices). In contrast, the strided memory locations 110 are allocated across all of the devices.

Each partition memory space corresponds to specific performance and memory resources. Not only are the partition memory spaces restricted to memory resources such as the devices or caches within the processor, the partition memory spaces are restricted to performance resources such as processing units, interfaces, crossbar connections, and the like. In the context of the following description, the performance and memory resources corresponding to a partition memory space are referred to as resources.

In the physical memory 100, the partition memory spaces are mapped to locations that are adjacent to and after the locations mapped to the strided memory space, with the allocation boundary 103 separating the strided memory locations 110 from the partition memory locations 115A and 115B. A format may be specified for each memory space, strided or partition. The format may specify a swizzle operation or hash function that is applied to a local memory address during the mapping operation.

The specific locations in the local memory 100 to which the memory spaces are mapped are not necessarily linearly contiguous due to address bit swizzling or hashing of the location addresses. Swizzling rearranges the bits of the location address to distribute the linear addresses across a memory space. For example, two of the location address bits may be swapped to distribute data across different banks of a DRAM. When all of the location addresses are swizzled according to the same rule, all of the location addresses are allocated for the memory space. Hashing modifies the bits of the location address according to a rule, to distribute data across a range of the location addresses (e.g., the memory space). For example, for the locations 0 to the common boundary 101 in each device, all of the locations within a range from 0 to the common boundary 101 are allocated and are mapped to local memory addresses for the memory space. In contrast, for the locations from the common boundary 101 to the allocation boundary 103 in each device, only some of the locations are mapped to local memory addresses for the memory space. Specifically, unused (unavailable) locations may be included within the locations between the boundaries 101 and 103.

Figure 1B:
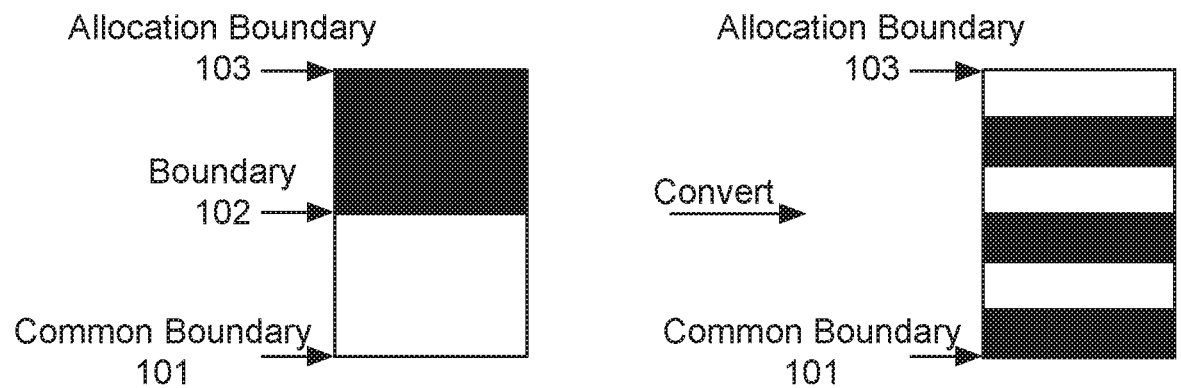
FIG. 1B illustrates a conversion of linear addresses to location addresses, in accordance with an embodiment.

FIG. 1B illustrates a conversion of linearly contiguous local memory addresses to location addresses, in accordance with an embodiment. The linearly contiguous local memory addresses between boundaries 101 and 102 are used and the linearly contiguous local memory addresses between boundaries 102 and 103 are unused. The linearly contiguous local memory addresses between the common boundary 101 and a boundary 102 are converted via hashing or swizzling to non-contiguous location addresses between the common boundary 101 and an allocation boundary 103.

Figure 1C:
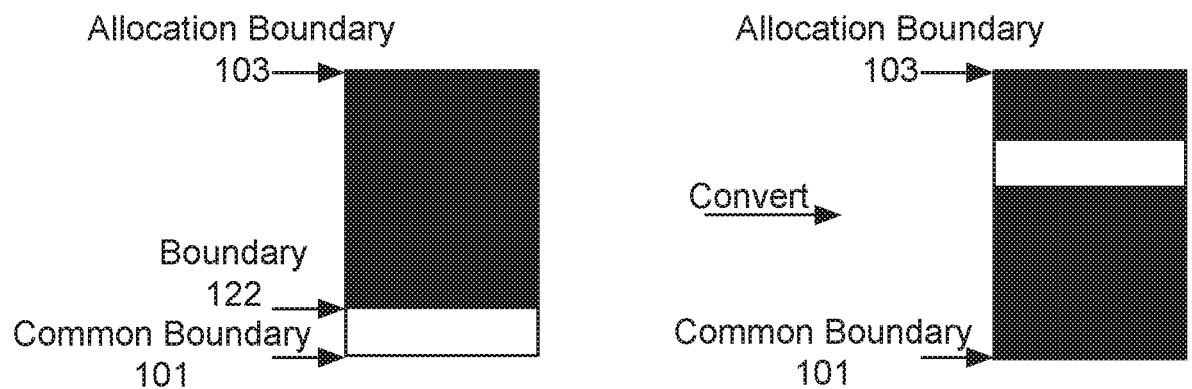
FIG. 1C illustrates another conversion of linear addresses to location addresses, in accordance with an embodiment.

FIG. 1C illustrates another conversion of linearly contiguous addresses to location addresses, in accordance with an embodiment. The linearly contiguous local memory addresses between the common boundary 101 and a boundary 122 are converted via hashing or swizzling to non-contiguous location addresses between the common boundary 101 and the allocation boundary 103. The locations of strided memory locations 110 between boundaries 101 and 103 in FIG. 1A may be non-contiguous as shown in FIG. 1B or 1C. The locations of strided memory locations 110 between boundaries 101 and 103 in FIG. 1A may be non-contiguous in a different pattern than what is shown in FIGS. 1B and 1C.

In general, the format of the strided memory space causes addresses mapped to locations in a linear order to be reordered into a different order. For example, when the format specified for the strided memory space changes, addresses may be mapped to the unused locations or even locations in the partition memory locations 115A and/or 115B. Therefore, the allocation boundary 103 should be defined to ensure that, for the format specified for the strided memory space, no addresses in the strided memory space are mapped to the partition memory locations 115A or 115B. Furthermore, the specific location addresses are not necessarily linearly contiguous when the number of memory devices is not a power-of-two.

When the number of memory devices is not a power-of-two, common boundaries will not necessarily form at a power-of-two physical location addresses. Similarly, when the number of memory resources, such as caches within the processor, is not a power-of-two, common boundaries will not necessarily form at a power-of-two physical location addresses. In an embodiment, a memory management unit (MMU) manages pages at power-of-two physical location addresses, which each correspond to a page (or a number of pages, depending on the distance between a partition memory space allocation boundary and the nearest common boundary. To ensure a common boundary between the strided memory locations 110 and the partition memory locations 115A and 115B, pages need to be blacklisted to make the address mapping hashing functional and ensure isolation (i.e., prevent aliasing into different address spaces). A boundary is a common boundary when the boundary aligns to an integer multiple of MMU pages and an integer multiple of D, the number of memory devices.

For example, when the format specified for the strided memory space may cause some addresses to be mapped to locations beyond the allocation boundary 103, a buffer region (not shown in FIG. 1A) is included between the allocation boundary 103 and the start of the partition memory locations 115A and 115B. The buffer region is aligned at a nearest common boundary (or contains the nearest common boundary) that bounds the strided memory locations 110 and the nearest common boundary is the start of the partition memory spaces. In one embodiment, locations in the buffer region are blacklisted and are unavailable for allocation to the strided memory space or the partition memory spaces. Clearly, the buffer region is wasteful since it includes memory resources that cannot be allocated. The unused locations with the strided memory locations 110 are similarly wasteful when no address within the strided memory space maps to the unused locations. A solution that allocates the unused locations to the partition memory spaces overly complicates the address mapping computation compared with aligning the partition memory locations to a common boundary. Instead of allocating the unused locations, the unused locations between the common boundary 101 and the allocation boundary 103 may be borrowed from the partition memory locations 115A and 115B, as described further herein, thereby offsetting the boundary between the strided memory space and the partition memory spaces from the allocation boundary 103 to the common boundary 101.

In an embodiment, to facilitate fast address translation or mapping (when using a virtual machine and hypervisor), a virtual MMU page may be large (usually in tens of MBs) and the common boundary granularity or resolution is correspondingly large. Therefore, the blacklisting mechanism (at vMMU page level) will result in large memory resource capacity loss due to the larger blacklisted regions. In an embodiment, to avoid blacklisting any page, address mapping may apply a technique to generate a cut off at the "nearest common boundary" for partition memory spaces. The address locations where each strided and partition memory space starts and ends is tracked. When an address location at the end of a strided memory space and the start of a partition memory space does not fall on a common boundary, a small portion (remainder) of addresses mapped to locations in the strided memory space are mapped into locations in each partition memory space. Specifically, the remainder of addresses that are beyond the "nearest common boundary" within the strided memory space. For example, as shown in FIG. 1A, the common boundary 101 is the nearest common boundary within the strided memory space. The remapping results in the strided memory space ending at the nearest common boundary and the start of the partition memory space is offset down to the nearest common boundary. The strided memory space and each offset partition memory space start and end at common boundaries and no blacklisting of memory pages is needed.

Figure 1D:
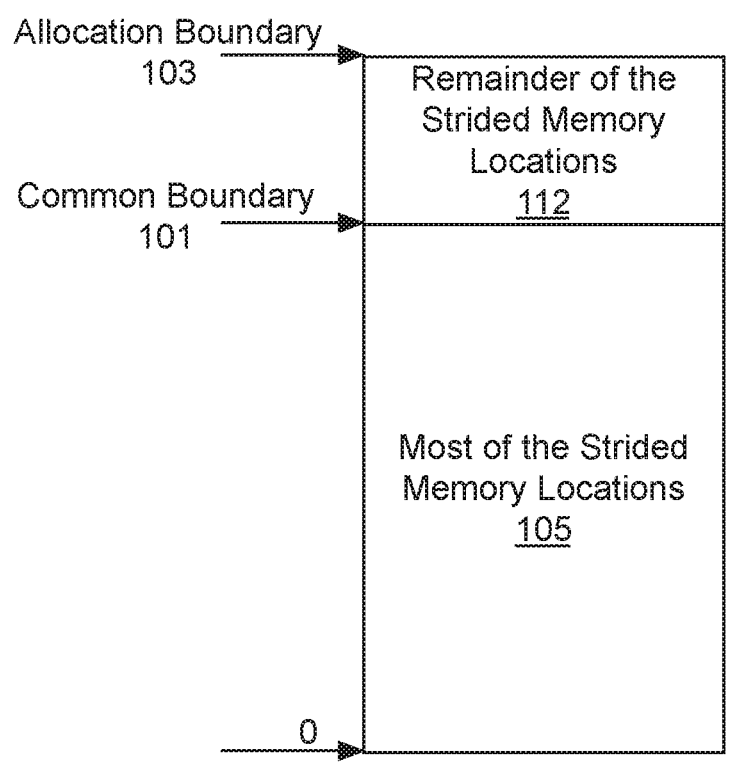
FIG. 1D illustrates most of the strided memory locations and a remainder of the strided memory locations, in accordance with an embodiment.

FIG. 1D illustrates an amount (most) of the strided memory locations 105 and a remainder of the strided memory locations 112, in accordance with an embodiment. Within the physical memory 100, the strided memory space may be mapped to a first subset of locations aligned at the common boundary 101 and a second subset of locations, the remainder of the strided memory locations 112, that is not evenly distributed across the devices. For the first subset, the strided memory locations 105 are evenly distributed across the devices. In an embodiment, the second subset includes locations offset from the common boundary 101 to start at a location (not shown in FIG. 1D) within each partition memory space. The partition memory spaces are mapped to locations starting at the nearest common boundary, the common boundary 101. Furthermore, the second subset is mapped according to the formats specified for the locations allocated to the partition memory spaces. The remainder of the strided memory locations 112 are distributed between the partition memory spaces, and each portion of the remainder is mapped according to the format specified for the partition memory space to which the portion is distributed.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1E:
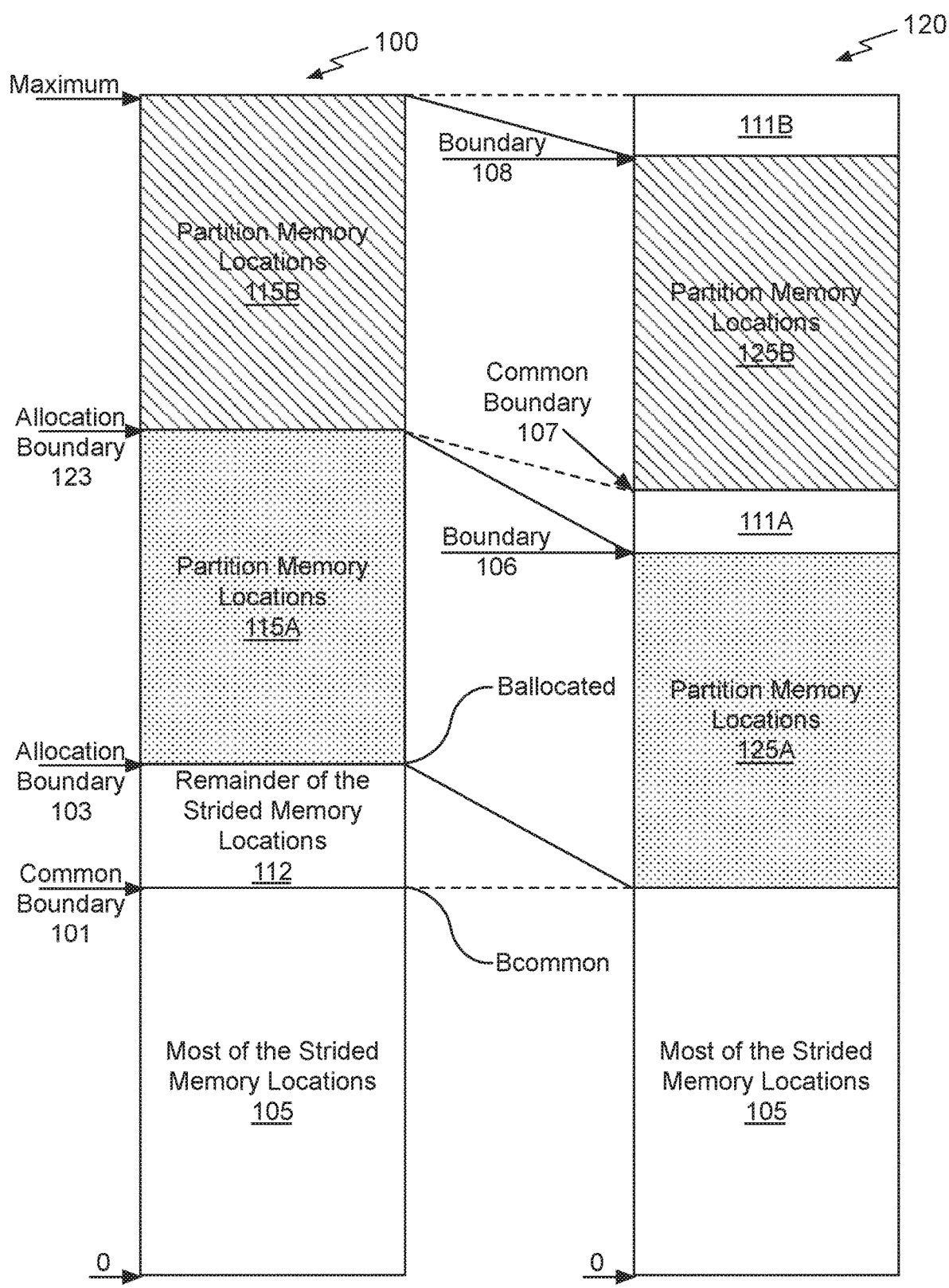
FIG. 1E illustrates strided and partition memory spaces mapped to locations at a common boundary, in accordance with an embodiment.

FIG. 1E illustrates strided and partition memory spaces mapped to locations in local physical memory 120 aligned at a common boundary, in accordance with an embodiment. The local physical memory 100 from FIG. 1A is shown on the left side of FIG. 1E, where the strided memory space is allocated the address locations starting at 0 (a common boundary) to Ballocated, ending at the allocation boundary 103. The address locations starting at Ballocated to maximum are available for the partition memory spaces. The first partition memory space is allocated the partition memory locations 115A, starting at Ballocated to (maximum−Ballocated)/2, ending at the allocation boundary 123. A second partition memory space is allocated the partition memory locations 115B, starting at (maximum−Ballocated)/2 to maximum, ending at maximum (a common boundary). When Ballocated is not at a common boundary in the local physical memory 100, the remainder of the strided memory locations 112 is instead mapped into the partition memory spaces, as shown in the local physical memory 120.

An amount (e.g., most) of the strided memory space is mapped to most of the strided memory locations 105 including a first subset of locations ranging from zero to the common boundary 101. The amount of locations in the most of the strided memory locations 105 are within a location address range (e.g., 0 to Bcommon) aligned between two common boundaries (0 and the common boundary 101). The amount of the strided memory space between 0 and Bcommon is mapped entirely within the first subset of locations, accounting for the format specified for the memory space and the number of devices included in the local physical memory 120. In other words, no address for the strided memory space that is within most of the strided memory locations 105 (the first subset of locations) is mapped to a location outside of 0 and Bcommon.

The remainder of the strided memory space 112 between Bcommon and Ballocated is mapped to the remainder locations 111A and 111B including a second subset of locations within the locations allocated to the first and second partition memory spaces. The remainder of the strided memory locations 112 is mapped to the locations between boundary 106 and common boundary 107 and boundary 108 and the maximum. In other words, the remainder of the strided memory space 112 is mapped to locations that are offset compared with the locations ranging from Bcommon and Ballocated, maintaining the common boundary 101 between most of the strided memory locations 105 and the partition memory locations 125A.

The partition memory spaces are mapped to partition memory locations 125A and 125B between the first common boundary 101 at Bcommon and the second common boundary 107 at Bcommon+FirstPartitionSize+Remainder/2, where FirstPartitionSize is the size of the partition memory locations 125A and Remainder is the size of the remainder of the strided memory locations 112. The remainder locations 111A is aligned at the second common boundary 107 and the remainder locations 111B are aligned at the maximum. Because Bcommon is at the first common boundary 101 and maximum is also a common boundary, (maximum−Bcommon)/2 is the location of the second common boundary 107. The second partition memory space, is mapped to the partition memory locations 125B aligned at the second common boundary 107.

The first partition memory space is allocated the locations starting at the common boundary 101 and ending at the common boundary 107. The second memory space is allocated the locations starting at the common boundary 107 and ending at the maximum. Note that the allocations provided to the partition memory spaces are increased, if needed, to accommodate the remainder of the strided memory locations 112. The number of locations needed for the remainder of the strided memory space, F, are distributed within the partition memory locations. For two equally resourced partition memory spaces, the partition memory locations that are allocated, are each increased by F/2. In other words, the remainder of the strided memory space 112 is divided by the number of partition memory spaces, so that the remainder of the strided memory space 112 is distributed proportionally between the partition memory locations 125A and 125B. The allocation for the partition memory locations 125A will change from the allocation boundary 103 to boundary 123 to an allocation in half of the devices from common boundary 101 to common boundary 107.

The remainder of the strided memory space 112 that is mapped to the remainder locations 111A and 111B is mapped according to a format (e.g., swizzling, hashing) specified for the partition memory locations 125A and 125B, respectively. In contrast, most of the strided memory locations 105 are mapped according to a format specified for the strided memory space. Similarly, the strided memory locations 110 of FIG. 1A are mapped according to the format specified for the strided memory space. Conceptually, the remainder of the strided memory space 112 is mapped as if the remainder is within the partition memory spaces. When memory is allocated for the partition memory locations 125A and 125B, the allocations are sized to include space for the remainder of the strided memory space 112. In an embodiment, the memory allocated for the partition memory locations 125A and 125B is also sized to start and end at common boundaries. therefore, the partition memory locations 125A and 125B include available locations that may be mapped to a second strided memory space. In particular, the available locations may be mapped to a remainder of a second strided memory space.

The common or clean boundary is determined based on the unit size of memory that is allocated, which, in turn, is based on the number of devices. For example, for a total of 12 devices (D=12), a common boundary will be at any 3×64 KB pages. When a memory management unit is configured to operate on memory partitions having power-of-two boundaries and when D=12, $z=D*2^i$, where i is an integer. When the allocation boundary 103 is a power-of-two number, the allocation boundary 103 is not necessarily common across all D devices (i.e., the boundary is not clean). The common boundary 101 between most of the strided memory locations and the partition memory locations is determined as the closest common boundary just below the allocation boundary 103 at the end of the strided memory allocation.

Figure 1F:
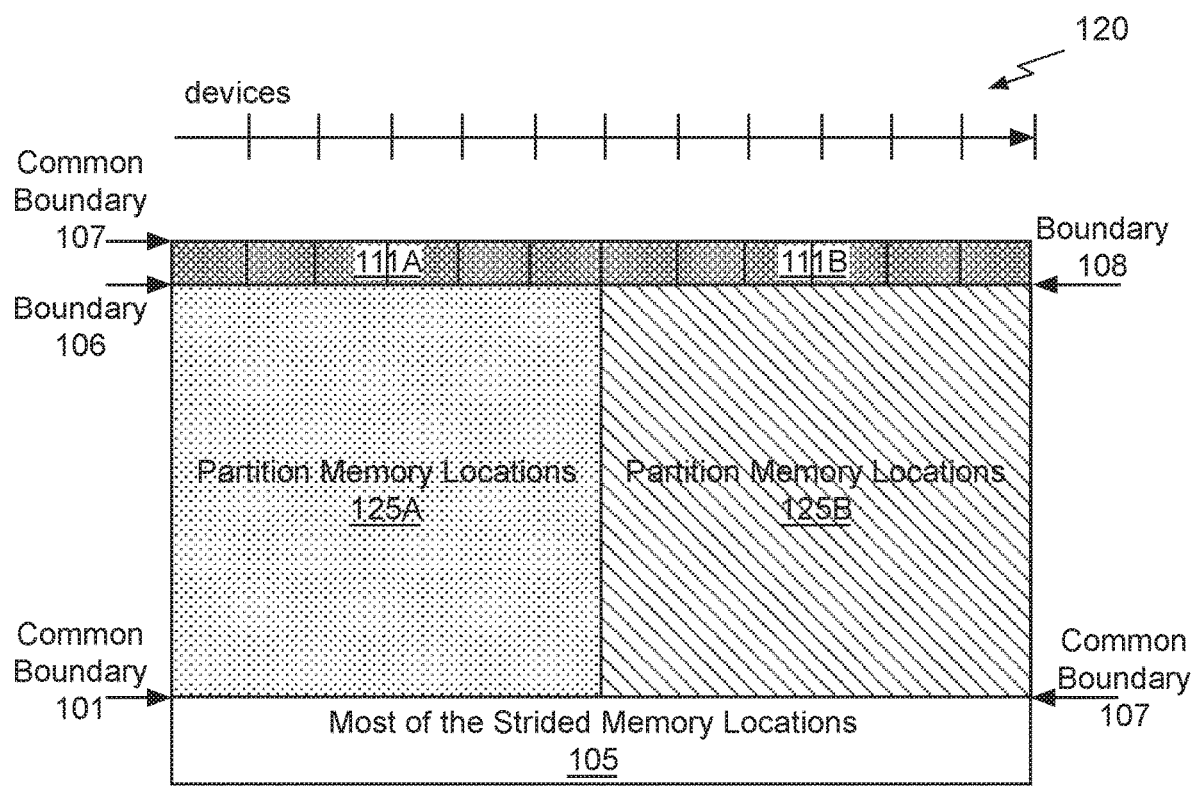
FIG. 1F illustrates strided and partition memory spaces mapped to locations in local physical memory 120 including twelve devices and aligned at a common boundary, in accordance with an embodiment.

FIG. 1F illustrates strided and partition memory spaces mapped to locations in local physical memory 120 including twelve devices and aligned at a common boundary, in accordance with an embodiment. The closest common boundary 101 is the upper boundary of most of the strided memory locations 105 and, for the example shown in FIG. 1F, is at 3*n*64 KB, where integer n=Bcommon/(3*64 KB). The remainder of the strided memory space that would be mapped beyond the common boundary 101 is instead mapped to remainder locations 111A and 111B. The partition memory locations start at location Bcommon instead of Ballocated and the partition memory spaces are mapped to locations ending at the common boundaries 106 and 108, respectively.

The location address in the first six of the twelve devices at the common boundary 101 equals the location address in the remaining six devices at the common boundary 107 because the high bits of the mapped address determine the partition memory space. Similarly, the common boundary 107 at the end of the locations allocated to the first partition memory space has the same location address for each device as the maximum at the end of the locations allocated to the second partition memory space. The remainder locations 111A and 111B are distributed across the devices and within the partition memory locations. The remainder of the strided memory space that is mapped to locations 111A are mapped according to a format specified for the partition memory locations 125A and the remainder of the strided memory space that is mapped to locations 111B are mapped according to a format specified for the partition memory locations 125B.

Figure 1G:
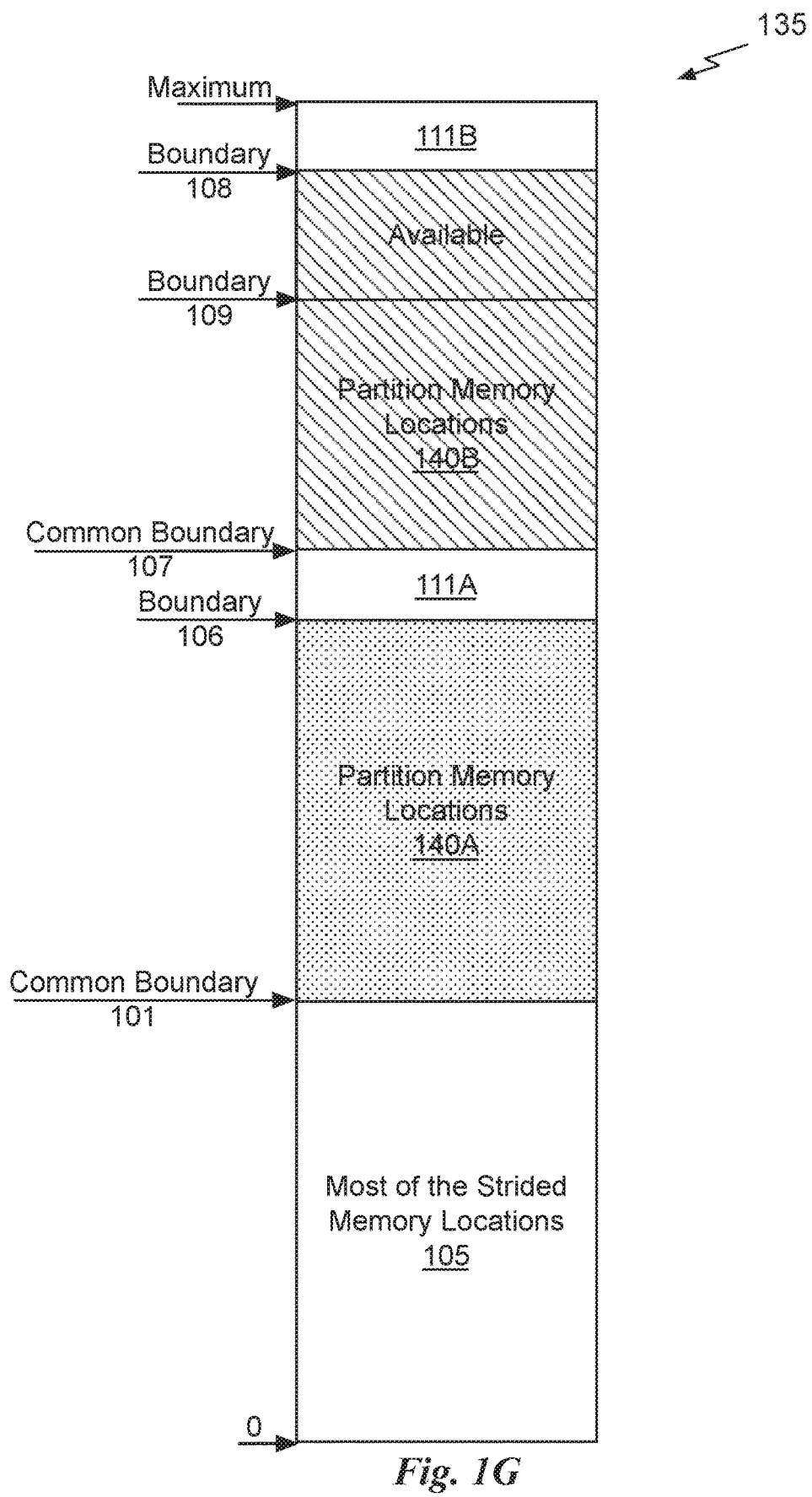
FIG. 1G illustrates strided and partition memory spaces mapped to locations in local physical memory aligned at a common boundary, in accordance with an embodiment.
Figure 1H:
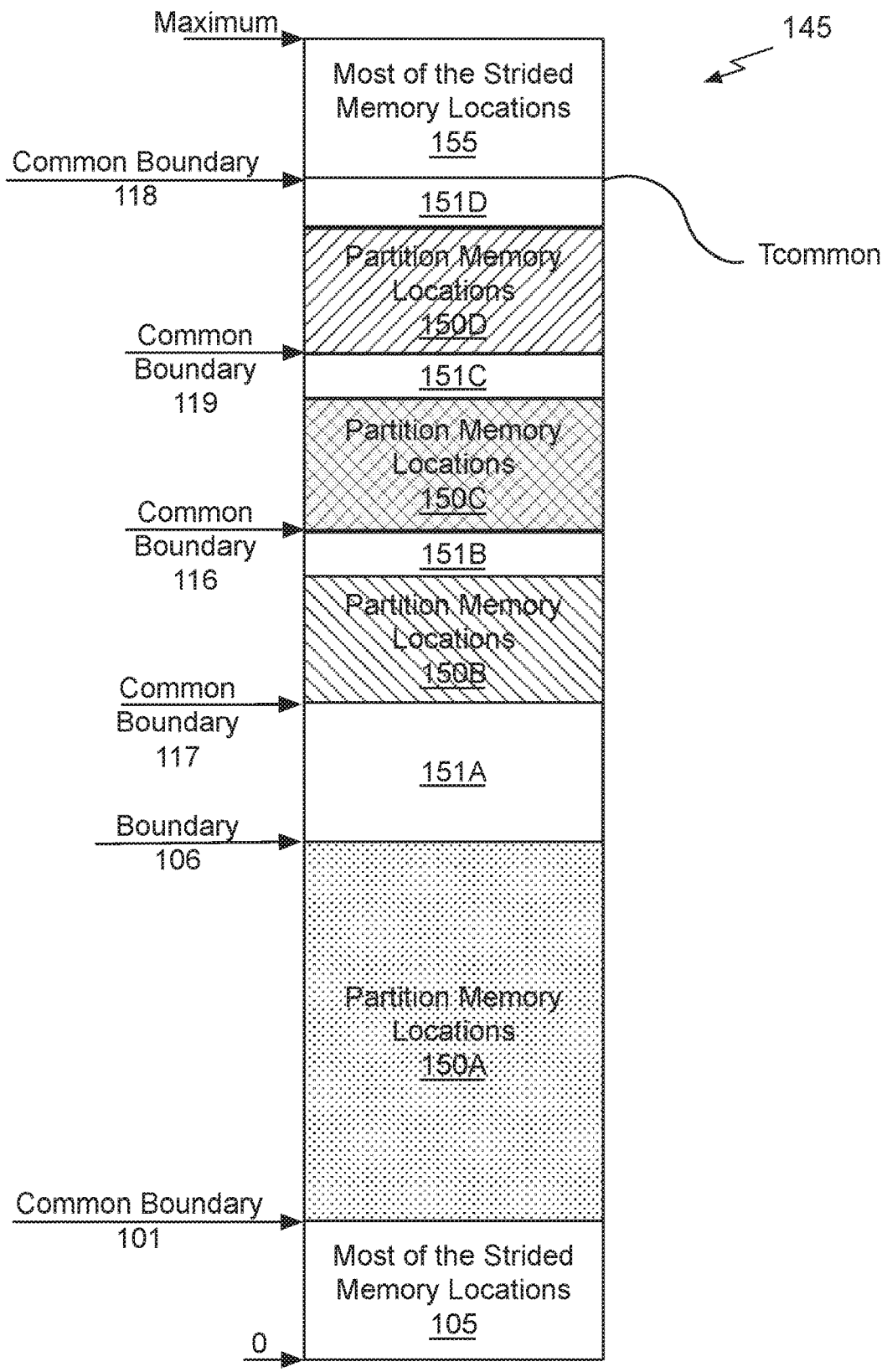
FIG. 1H illustrates strided and partition memory spaces mapped to locations in local physical memory aligned at a common boundary, in accordance with an embodiment.
Figure 11:
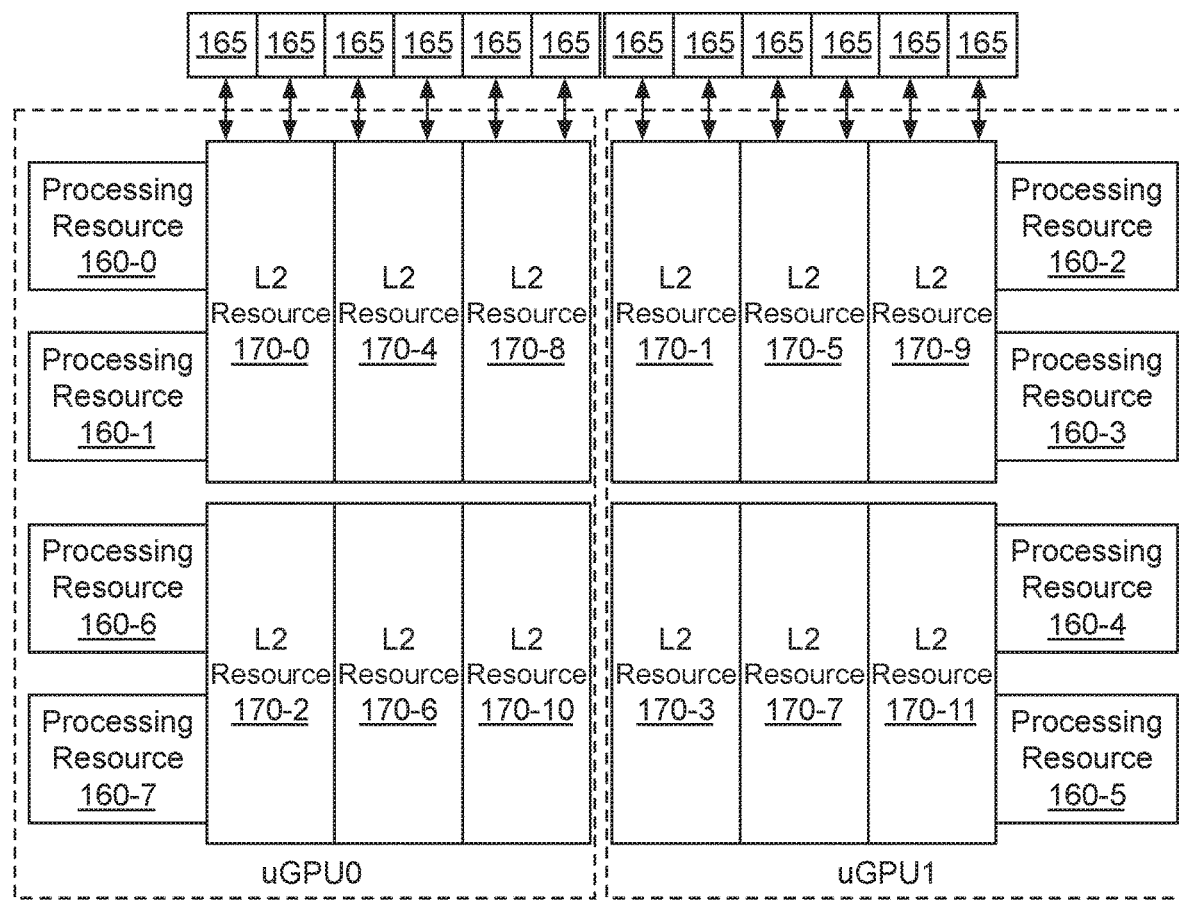

FIG. 1G illustrates strided and partition memory spaces mapped to locations in local physical memory 135 aligned at a common boundary, in accordance with an embodiment. An amount (most) of the strided memory space is mapped to most of the strided memory locations 105 including a first subset of locations ranging from zero to the common boundary 101. The remainder of the strided memory space is mapped to the remainder locations 111A and 111B including a second subset of locations within the memory locations mapped to the partition memory spaces. The amount of memory allocated to the partition memory space 140B is less than the amount of memory allocated to the partition memory space 140A, so more locations are available for allocation within the partition memory space 140B. However, a common boundary 107 is provided between the locations allocated to the first and second partition memory spaces and the remainder locations 111A and 111B are distributed equally between the partition memory locations 140A and 140B.

FIG. 1I illustrates strided and partition memory spaces mapped to locations in local physical memory 145 aligned at a common boundary, in accordance with an embodiment. An amount of the strided memory space is mapped to most of the strided memory locations 105 including a first subset of locations ranging from zero to the common boundary 101. The remainder of the strided memory space is mapped to the remainder locations 151A, 151B, 151C, and 151D that are a second subset of locations within the locations allocated to the partition memory spaces mapped to the locations 150A, 150B, 150C, and 150D, respectively. The partition memory spaces mapped to the partition memory locations 150B, 150C, and 150D are each allocated one-third of the resources allocated to the partition memory space that is mapped to the partition memory locations 150A. However, a common boundary 117 in the local physical memory 145 is provided between the locations allocated to the first partition memory space and the second partition memory space mapped to the partition memory locations 150B. Common boundary 116 is provided between the locations allocated to the second and third partition memory spaces mapped to the partition memory locations 150B and 150C. Common boundary 119 is provided between the locations allocated to the third and fourth partition memory spaces mapped to the partition memory locations 150C and 150D.

In an embodiment, a second strided memory space is also mapped to locations in the local physical memory 145. Most of the strided memory locations 155 are mapped to location addresses ranging from the common boundary at a common boundary 118 to another common boundary at maximum according to a format specified for the second strided memory space. A remainder of a second strided memory space is mapped to at least a portion of the available locations within locations 151A, 151B, 151C, and 151D. The remainder of the second strided memory space is distributed proportionally across the partition memory locations 151A, 151B, 151C, and 151D, and is mapped according to the format specified for the partition memory locations 151A, 151B, 151C, and 151D, respectively. The common boundary 118 is at a location Tcommon and the remainder of the second strided memory space M=Tcommon−Tallocated. Bcommon+FirstPartitionSize+(F+M)/2=(Tcommon−Bcommon)/2

FIG. 1I illustrates a block diagram of a processor and local memory, in accordance with an embodiment. The processor includes two micro GPUs, uGPU0 and uGPU1, where each micro GPU includes half of the processing resources of the processor. The local memory associated with the processor includes D physical memory devices 165. When the processor is partitioned into two or more separate smaller processors for access by different clients, resources, including the physical memory devices 165 are partitioned. A first half (six) of the physical memory devices 165 coupled to uGPU0 may correspond to the memory partition locations 115A or 125A and a second half of the physical memory devices 165 coupled to uGPU1 may correspond to the memory partition locations 115B or 125B.

Performance resources within the processor are also partitioned according to the two or more separate smaller processors. The resources may include level two cache (L2) resources 170 and processing resources 160. As shown in FIG. 1G, in an embodiment, three L2 resources 170 are accessed by two processing resources 160. For example, the processing resources 160-0 and 160-1 access the three L2 resources 170-0, 170-4, and 170-8. Each L2 resource 170 is coupled to two of the physical memory devices 165.

A partition memory space is isolated and a client associated with the partition memory space is only able to access resources allocated to the partition. In contrast, a strided memory space is not isolated to specific resources.

Figure 2A:
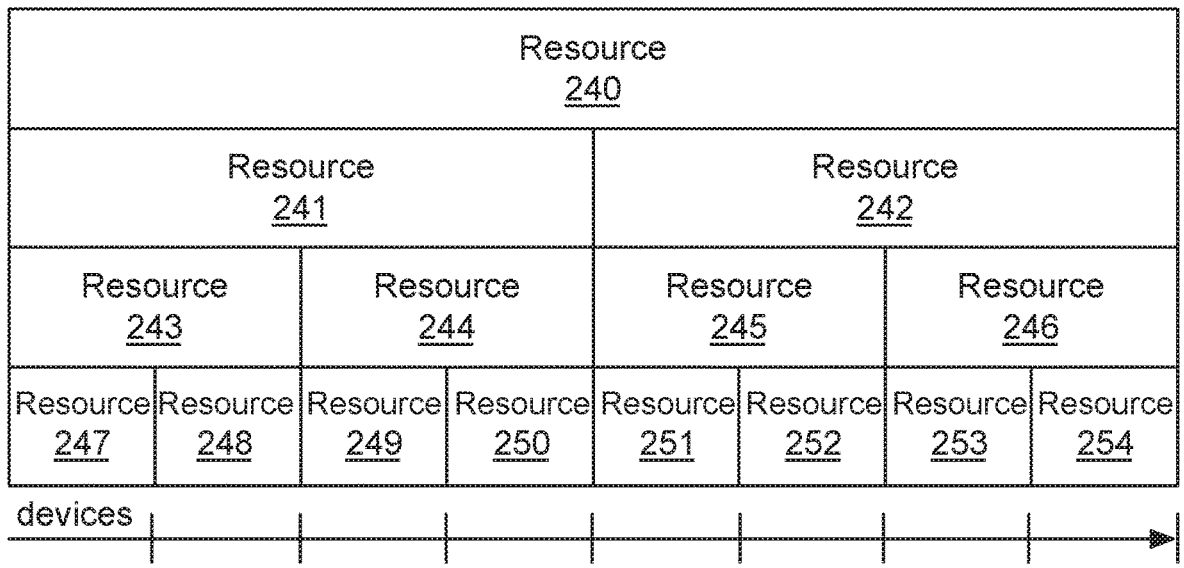
FIG. 2A is a conceptual diagram illustrating various resource allocations for partitions, in accordance with an embodiment.

FIG. 2A is a conceptual diagram illustrating various resource allocations for partitions, in accordance with an embodiment. The processor may be partitioned into smaller processing elements based on individual client requirements. The smaller processing elements and corresponding local physical memory provide the performance and memory resources corresponding to a partition memory space and the combined (memory and performance) resources allocated to a partition are referred to as a resource. In an embodiment, partitions may vary in resource capacity (e.g., 1, ½, ¼, ¾, ⅛, ⅜, ⅝, ⅞ of the resource) corresponding to different resources 240, 241, 242, 243, 244, 245, 246, 247, 248, 249, 250, 251, 252, 253, and 254.

The resource 240 that may access all resources. The resource 240 may be allocated to a strided memory space or a single partition, when only one partition memory space is used. A format may be specified including a swizzle or hash operation that is applied, during the address mapping operation, to produce a location address. In contrast, when multiple partitions are allocated resources, the resources are exclusive to each one of the partitions. A format may be specified for each partition. Each partition is associated with an identifier that defines one of the resources 240, 241, 242, 243, 244, 245, 246, 247, 248, 249, 250, 251, 252, 253, and 254 and the identifier is used to determine the format for the partition.

The resources 241 and 242 may be allocated to two equal sized partition memory spaces associated with two different clients. The client allocated to the resource 241 may exclusively perform operations using the processing resources of the uGPU0 and the local physical memory mapped to the resource 241. Similarly, the client allocated to the resource 242 may exclusively perform operations using the processing resources of the uGPU1 and the local physical memory mapped to the resource 242. A first format may be specified for resource 241 and a second format may be specified for resource 242. For example, the lowest two bits of the physical address may be swizzled for memory resources corresponding to the resource 242 and the second and third lowest bits of the physical address may be swizzled for memory resources corresponding to the resource 242. In an embodiment, high bits of the physical address are used to generate a Galois sequence that is used to swizzle lower bits of the physical address.

Three resources, namely resources 241, 245, and 246, may be allocated to three partition memory spaces associated with three different clients, where the resources corresponding to the resources 245 and 246 are each half of the partition resources corresponding to the resource 241. Similarly, the resources may be partitioned into three resources, namely resources 242, 243, and 244, where the partition resources corresponding to the resources 243 and 244 are each half of the partition resources corresponding to the resource 242. The client allocated to the resource 245 may exclusively perform operations using the processing resources of the processing resources 160-2 and 160-3 and the L2 resources 170-2, 170-6, and 170-10 within the uGPU1 and the local physical memory mapped to the resource 245. Similarly, the client allocated to the resource 246 may exclusively perform operations using the of the processing resources 160-4 and 160-5 and the L2 resources 170-3, 170-7, and 170-11 within the uGPU1 and the local physical memory mapped to the resource 246. A first format may be specified for resource 241, a second format may be specified for resource 245, and a third format may be specified for resource 246.

Four resources, namely resources 243, 244, 245, and 246, may be allocated to four partition memory spaces associated with four different clients, where the partition resources corresponding to the resources 243, 244, 245, and 246 are equal. Eight resources, namely resources 247, 248, 249, 250, 251, 252, 253, and 254, may be allocated to eight partition memory spaces associated with eight different clients, where the partition resources corresponding to the resources 247, 248, 249, 250, 251, 252, 253, and 254 are equal. Five resources, namely resources 241, 251, 252, 253, and 254, may be allocated to five partition memory spaces associated with five different clients, where the partition resources corresponding to the resources 251, 252, 253, and 254 are a quarter of the partition resources corresponding to the resource 241. Six resources, namely resources 243, 244, 251, 252, 253, and 254, may be allocated to six partition memory spaces associated with six different clients, where the partition resources corresponding to the resources 251, 252, 253, and 254 are half of the partition resources corresponding to each the resources 243 and 244.

Figure 2B:
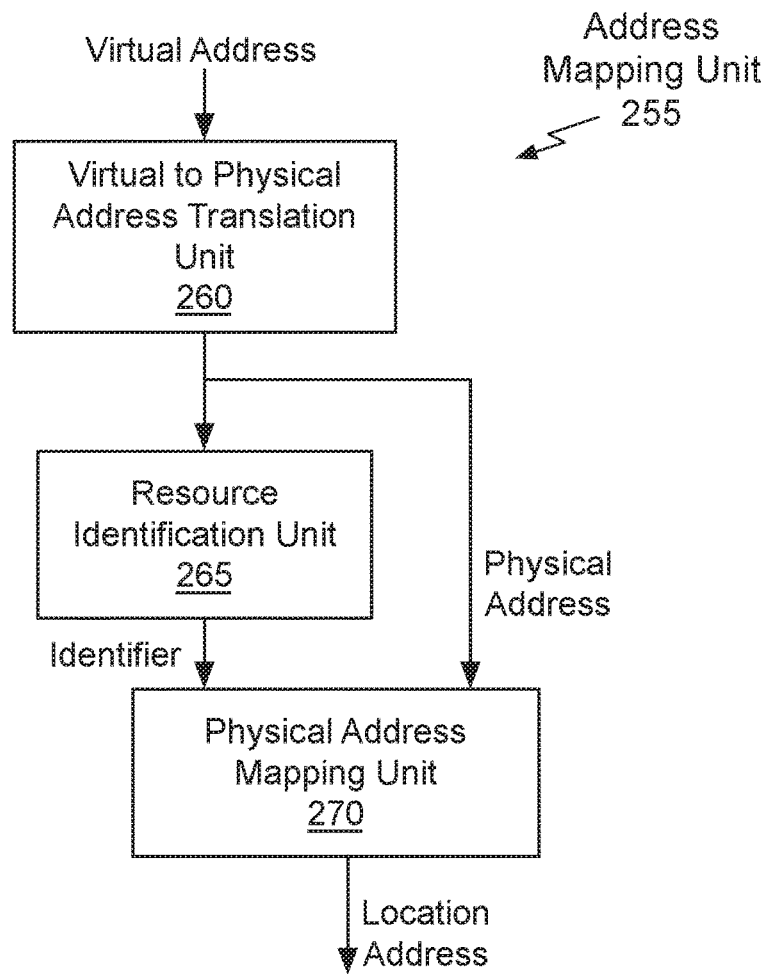
FIG. 2B illustrates a block diagram of an address mapping unit, in accordance with an embodiment.

FIG. 2B illustrates a block diagram of an address mapping unit 255, in accordance with an embodiment. The address mapping unit 255 includes a virtual to physical address translation unit 260, a resource identification unit 265, and a physical address mapping unit 270. The client or software application interface to memory is through a virtual address space that appears as contiguous. The separate virtual address spaces for each client are exclusive to the client. The virtual to physical address translation unit 260 converts each virtual address into a physical address. In an embodiment, virtual memory (VM) page allocation boundaries between stride and do not coincide with common (clean) boundaries between stride and partition memory locations. While different clients may access the same virtual address, the physical address space for each client is exclusive. In an embodiment, the physical address range spans across the physical memory devices 165 corresponding to the resource 240. The resource identification unit 265 receives the physical address and determines which of the resources 240, 241, 242, 243, 244, 245, 246, 247, 248, 249, 250, 251, 252, 253, and 254 the physical address is within.

In an embodiment, each resource 240 through 254 is defined by a different physical address range and the physical address received from the virtual to physical address translation unit 260 is compared with the resource address ranges. In an embodiment, the physical address range of the resources 240 through 254 is greater than the amount of memory provided by the devices 165. For example, the resources 245 and 251 are defined by different linear address ranges even though the resource 245 corresponds to the same devices 165 as the combination of resources 251 and 252. Either the resource 245 is allocated to a partition or the resources 251 and 252 are allocated to two partitions. Because the resources 245 and 251 overlap in their use of resources, only one of the resources may be allocated at a time.

The resource identification unit 265 outputs an identifier to the physical address mapping unit 270. The identifier defines the format and address mapping for the partition or strided address space associated with the virtual address (and physical address). In an embodiment, the identifier determines the base address of a memory location for the partition or strided address space.

The physical address mapping unit 270 converts or maps the physical address to a location address based on the identifier. In an embodiment, the physical address mapping unit 270 forces one or more of the address bits to a binary one or zero to ensure that the only the partition allocated to the resource defined by the identifier can access the location addresses for the partition. For example, a first physical address for a first partition allocated the resource 251 and a second physical address for a second partition allocated to the resource 252 may be mapped to the same location address. However, the location address for the first partition is used to access one or more first devices 165 that are separate from one or more second devices 165 that are accessed by the second partition using the same location address.

Although the address mapping unit 255 is described in the context of processing units, one or more of the virtual to physical address translation unit 260, the identification unit 265, and the physical address mapping unit 270 may be implemented as a program, custom circuitry, or by a combination of custom circuitry and a program. Furthermore, persons of ordinary skill in the art will understand that any system that performs the operations of the address mapping unit 255 is within the scope and spirit of embodiments of the present disclosure. In an embodiment, operations of one or more of the physical address translation unit 260, the resource identification unit 265, and the physical address mapping unit 270 are performed in a memory partition unit 380 shown in FIGS. 3 and 4B or an MMU 490 shown in FIG. 4A.

Figure 2C:
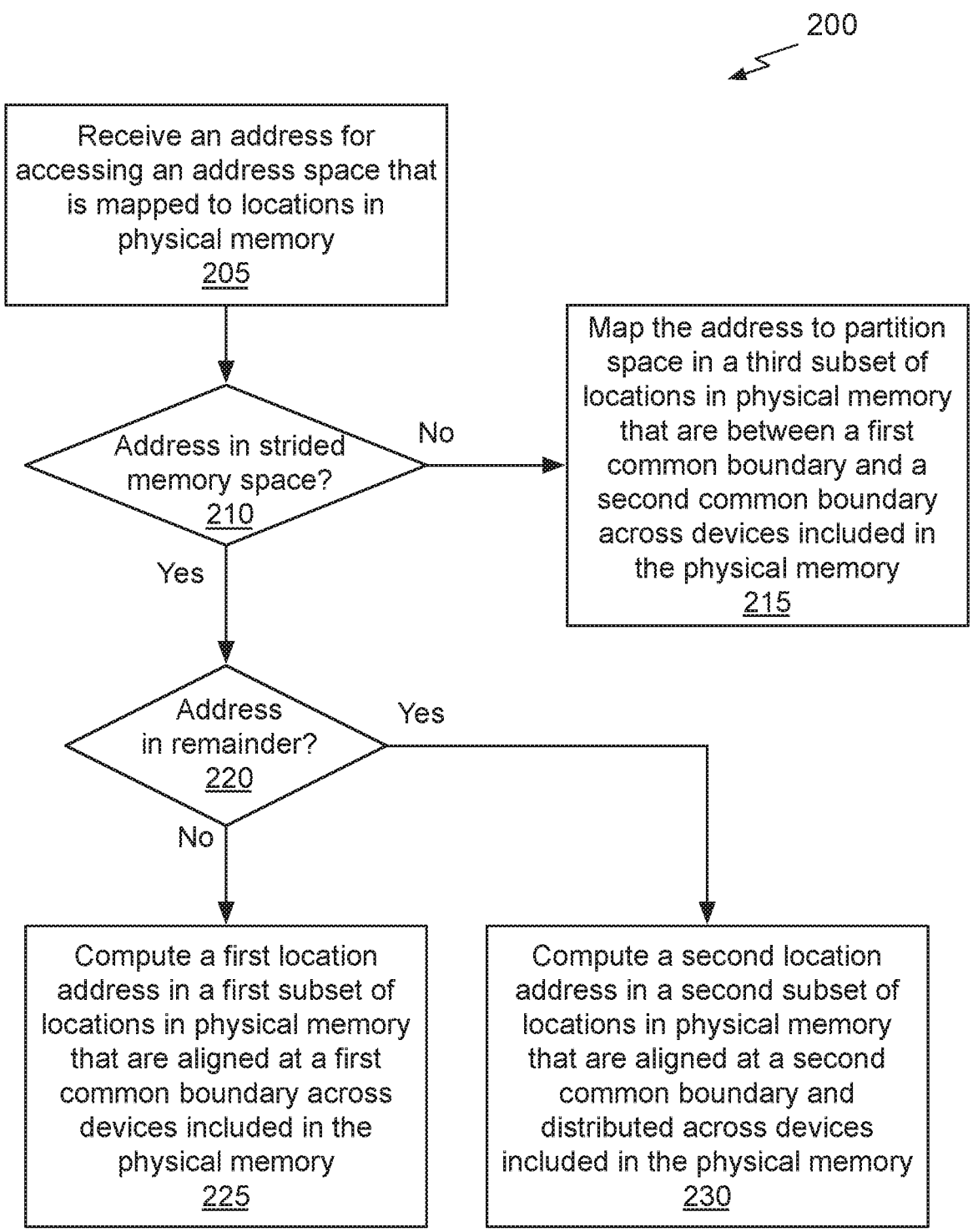
FIG. 2C illustrates a flowchart of a method for computing locations addresses for strided and partition memory spaces, in accordance with an embodiment.

FIG. 2C illustrates a flowchart of a method 200 for computing location addresses for a strided and partition memory spaces, in accordance with an embodiment. In an embodiment, the method 200 may be used to compute location addresses for the strided memory space mapped to most of the strided memory locations 105 and remainder of the strided memory locations 111, as shown in FIGS. 1C, 1D, and 1E.

At step 205, an address is received for accessing an address space that is mapped to locations in physical memory associated with a processor. In an embodiment, the address is a physical address that is converted from a virtual address by the virtual to physical address translation unit 260. In an embodiment, the address space is separated into a first portion corresponding to a strided memory space and a second portion corresponding to at least one partition memory space.

At step 210, the region identification unit 265 determines if the address is within strided memory space (the first portion). In an embodiment, the region identification unit 265 determines if the address is within the strided memory space. If, at step 210, the region identification unit 265 determines that the address is within the strided memory space, then the address is not within a partition memory space. In an embodiment, most of the first portion is mapped to a first subset of the locations in the physical memory that are aligned at a first common boundary across devices 165 included in the physical memory. In an embodiment, a remainder of the first portion is mapped to a second subset of the locations in the physical memory that are aligned at the second common boundary and distributed across devices 165 included in the physical memory.

In an embodiment, the first subset of the locations includes an equal amount from each one of the devices 165. In an embodiment, most of the first portion of the address space is mapped to most of the strided memory locations 105 that are aligned with the common boundary at x. In an embodiment, a remainder of the first portion of the address space is mapped to memory locations 111 that are aligned with a second common boundary at z. In an embodiment, the second subset of the locations includes different amounts from at least two of the devices 165.

At step 220, the resource identification unit 265 determines if the address is in the remainder of the first portion (the second subset). If, at step 220, the region identification unit 265 determines that the address is not within the remainder of the first portion, then at step 225 a first location address is computed in the first subset of locations in the physical memory that are aligned at the first common boundary across the devices 165 included in the physical memory.

If, at step 220, the resource identification unit 265 determines that the address is within the remainder of the first portion, then at step 230 a second location address is computed in the second subset of locations in the physical memory that are aligned at the second common boundary across the devices 165 included in the physical memory.

If, at step 210, the resource identification unit 265 determines that the address is not within the strided memory space then the address is within the second portion (partition memory space). The second portion of the address space is mapped to a third subset of the locations in the physical memory that are between the first common boundary and second common boundary across the devices 165. In an embodiment, the second portion of the address space corresponds to a partition memory space that is mapped to the one of the partition memory locations 125A or 125B between the first common boundary at x and the second common boundary at z. In an embodiment, the resource identification unit 265 determines if the address is within the second portion of the address space. At step 215, the address is mapped to partition memory space in the third subset of locations in the physical memory that are between the first common boundary and the second common boundary across devices 165 included in the physical memory.

In an embodiment, the second subset of the locations are distributed between the third subset of the locations proportionally for the at least one partition memory space. In an embodiment, the remainder of the first portion is mapped to the second subset of the locations according to a format specified for the second portion.

Although method 200 is described in the context of a processor, the method 200 may also be performed by a program, custom circuitry, or by a combination of custom circuitry and a program. For example, the method 200 may be executed by a GPU or CPU, or any logic device or processor capable of accessing a strided memory space and a partition memory space mapped to locations in a local memory. Furthermore, persons of ordinary skill in the art will understand that any system that performs method 200 is within the scope and spirit of embodiments of the present disclosure.

Separating the strided memory space into an aligned portion and remainder portion reduces the size of buffer regions (e.g., blacklisted locations) of memory that cannot be used for storage by either the strided memory space or a partition memory space by providing common boundaries across the memory devices 165. In addition to allocating memory resources for each partition memory space, processing resources may also be allocated, such as the processing resources 160 and/or the L2 resources 170. In effect, the processor may be subdivided into smaller processors that are each allocated to a different partition memory space assigned to a particular client. The resources in each smaller processor are isolated so that resources for a first client cannot be accessed by a second client. In particular, mapping of addresses to the location addresses of memory resources allocated to the first client cannot be accessed by the second client, so that the memory resources for each client are isolated.

Parallel Processing Architecture

Figure 3:
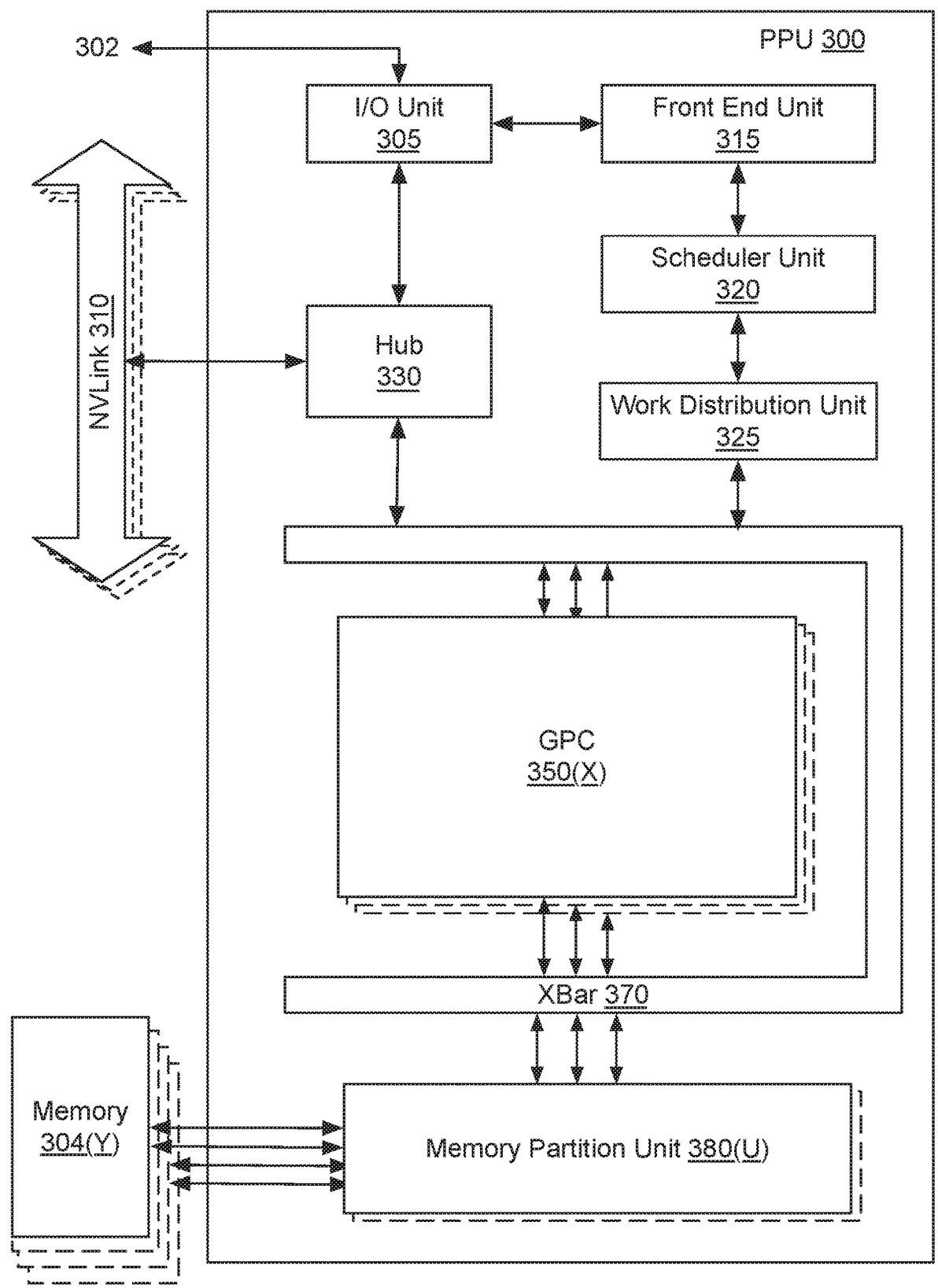
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
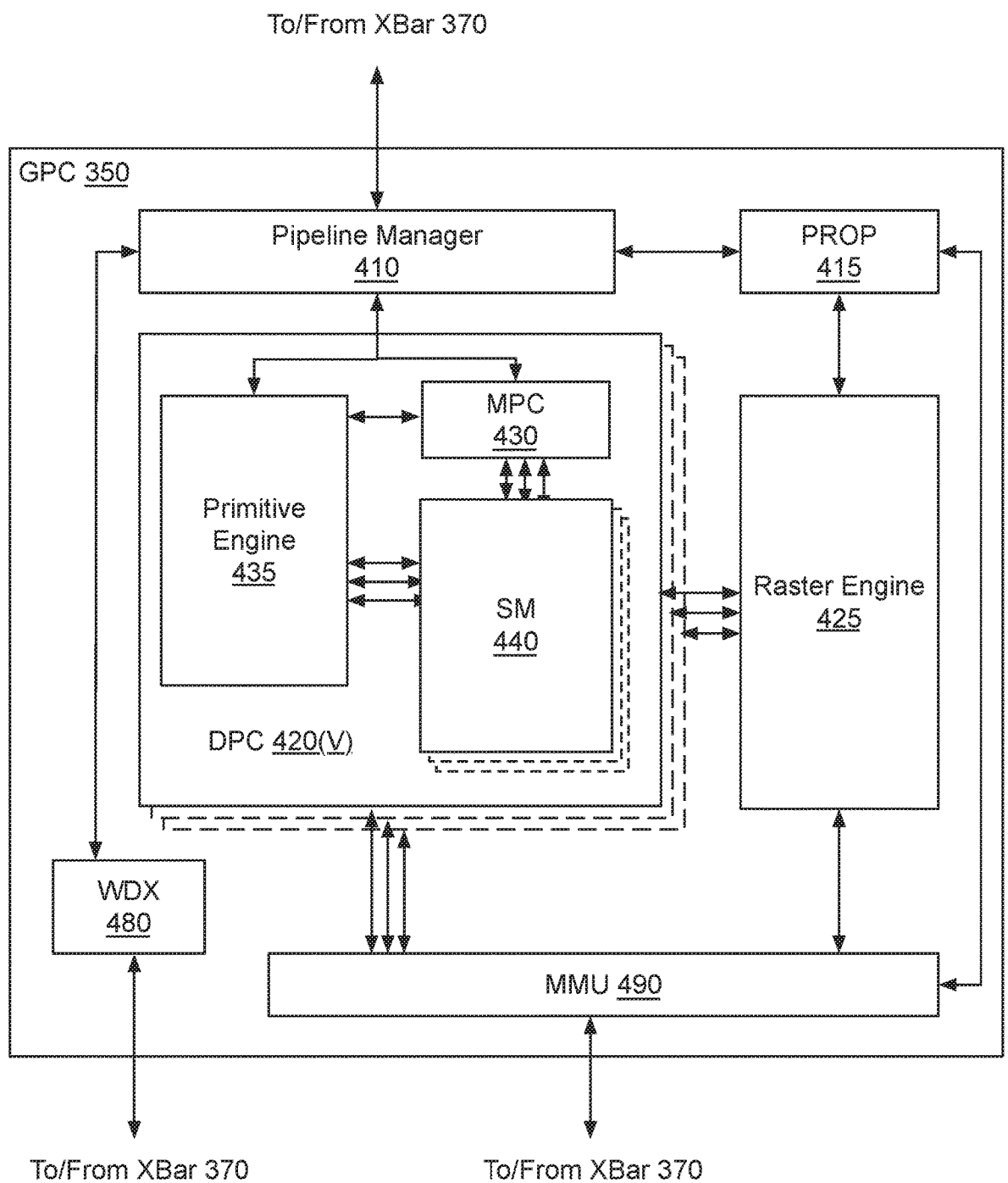
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
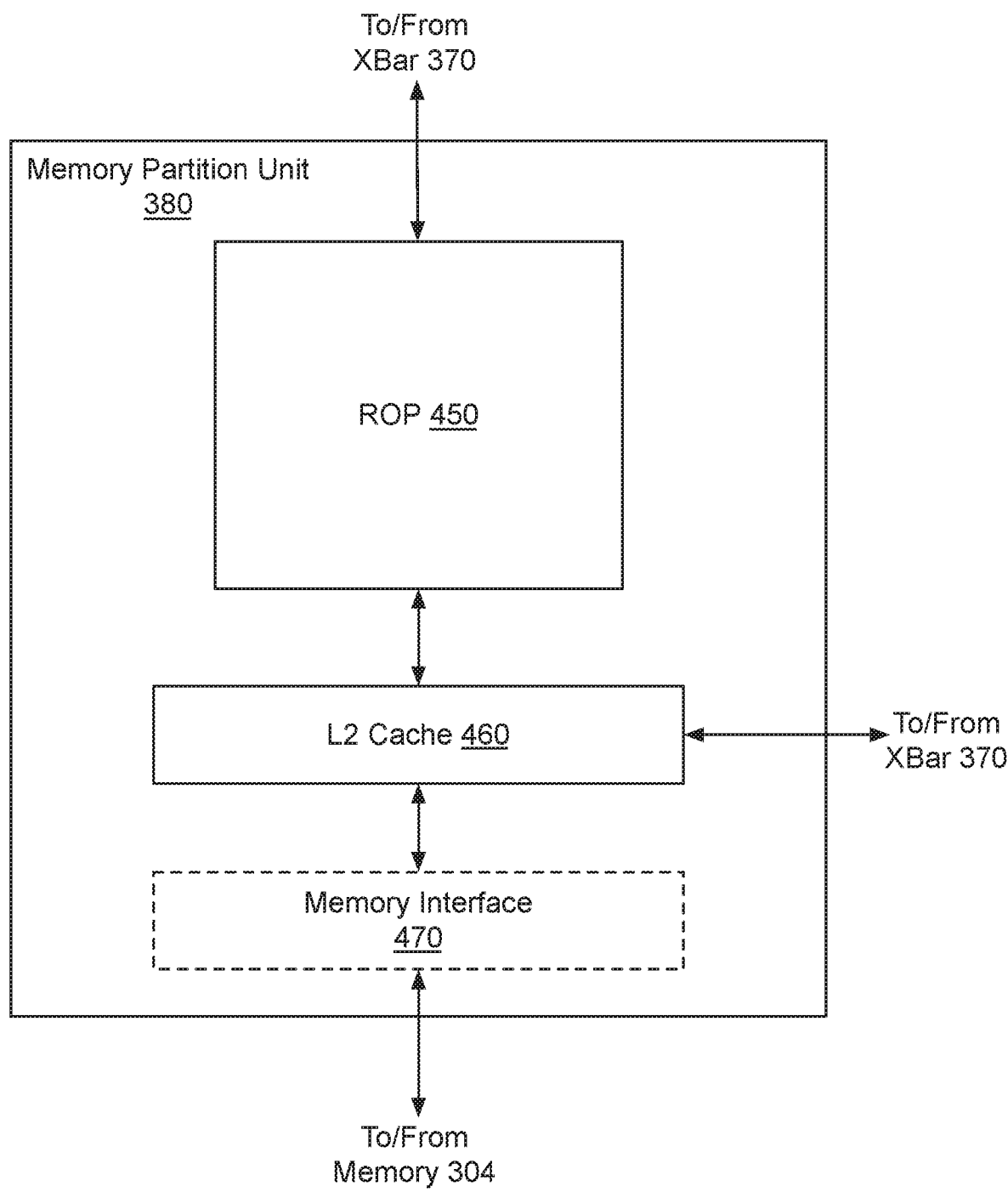
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBMx memory interface and Y equals half U. In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
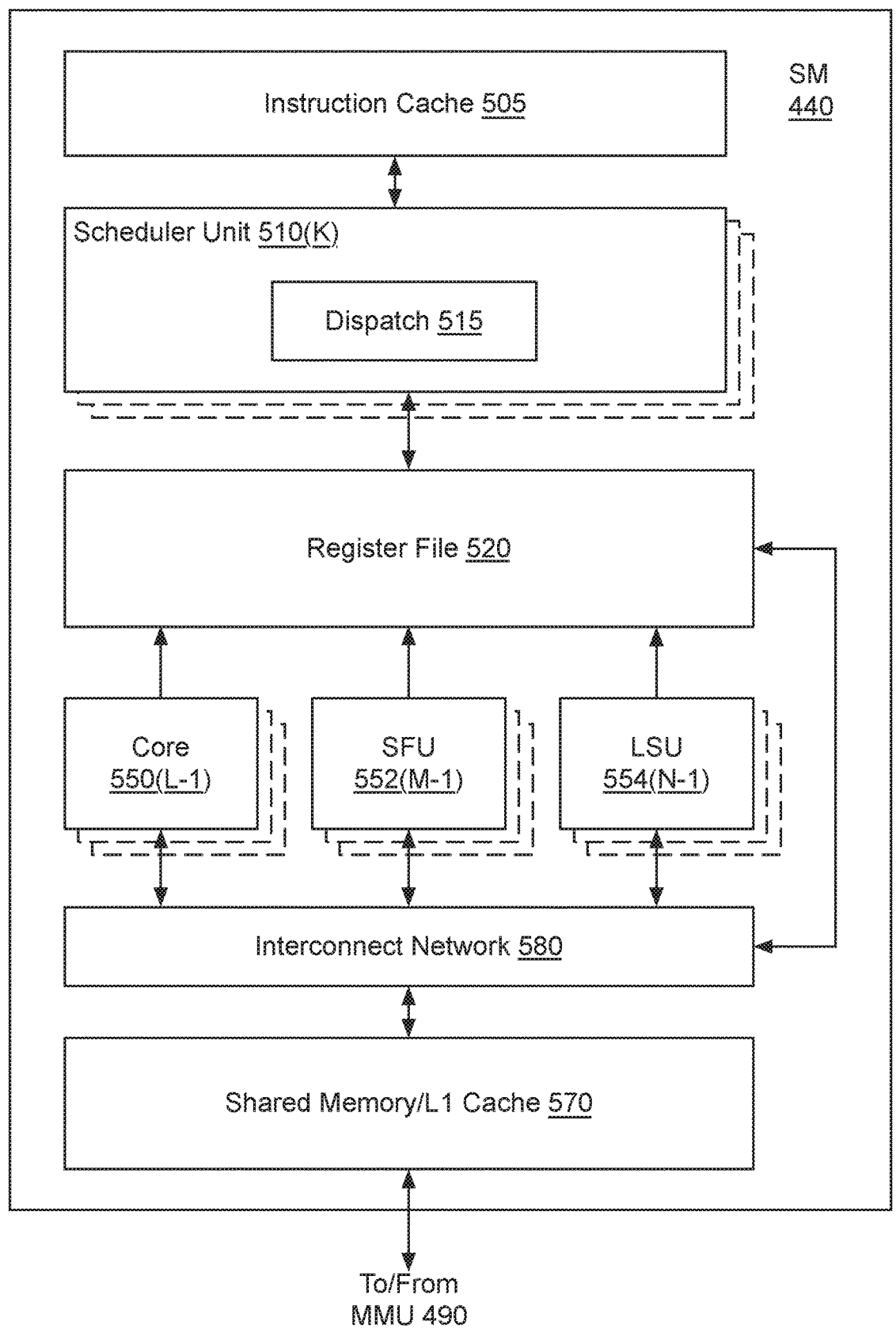
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
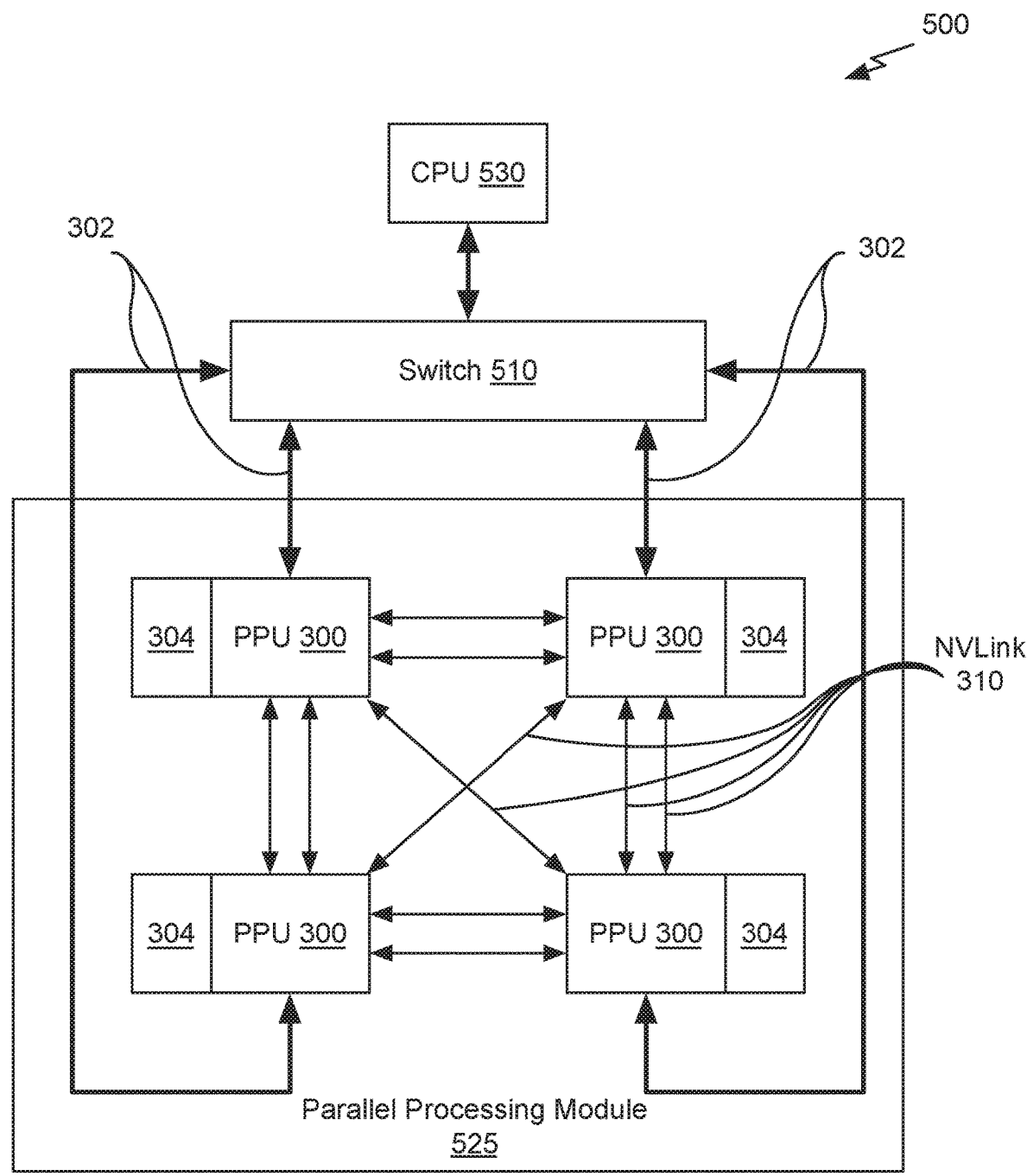
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 140 shown in FIG. 1D and/or the method 160 shown in FIG. 1E. The processing system 500 includes a CPU 530, switch 510, and multiple PPUs 300, and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
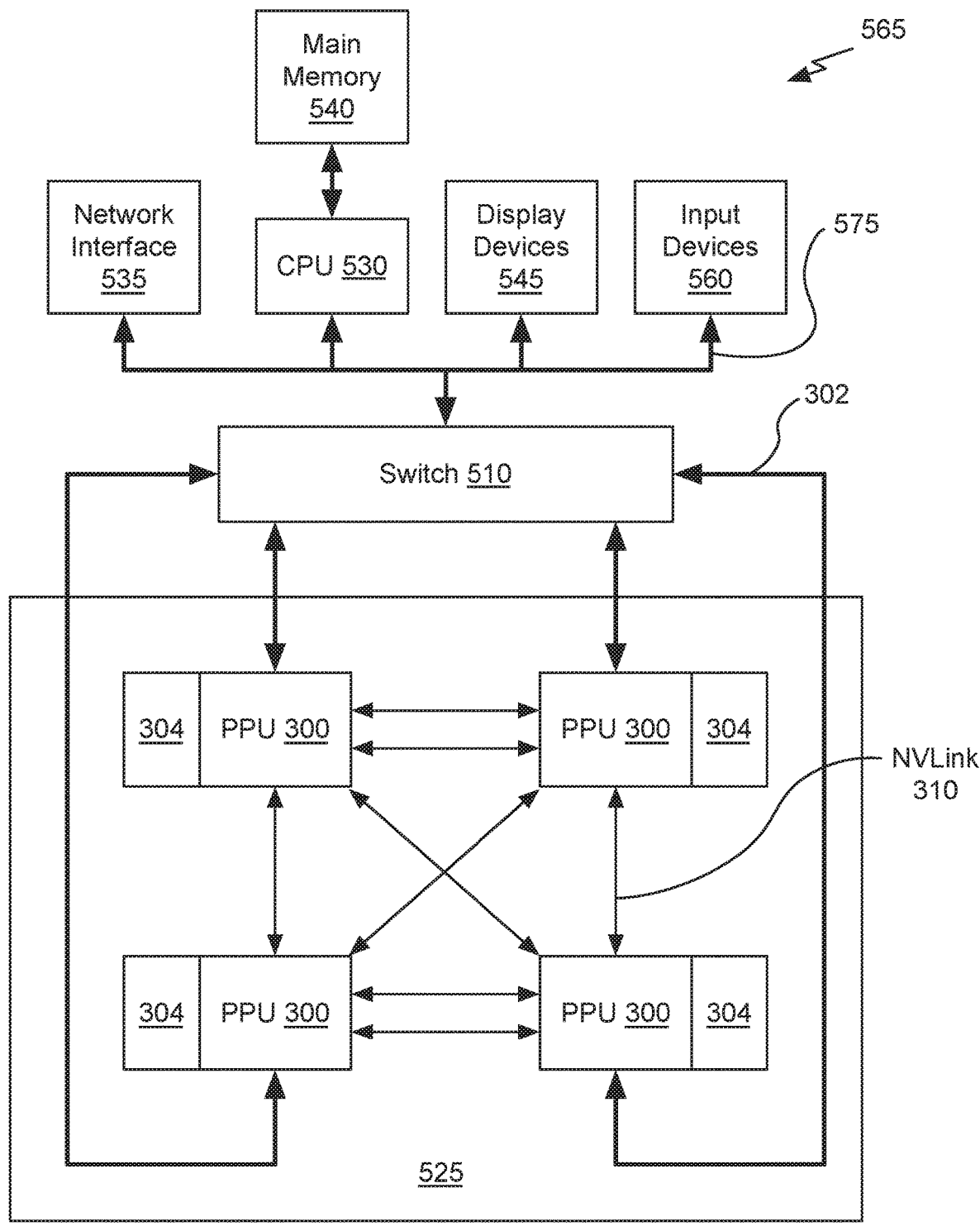
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 140 shown in FIG. 1D and/or the method 160 shown in FIG. 1E.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references used in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The invention claimed is:

1. A computer-implemented method, comprising:
receiving an address for accessing an address space that is mapped to locations in physical memory associated with a processor, wherein the address space is separated into a strided memory space and at least one partition memory space;
determining that the address is within the strided memory space, wherein
a first amount of the strided memory space is mapped to a first subset of the locations in the physical memory that are aligned at a first common boundary across devices included in the physical memory,
a remainder of the strided memory space is mapped to a second subset of the locations in the physical memory that are aligned at a second common boundary and distributed across the devices, and
a first partition memory space of the at least one partition memory space is mapped to a third subset of the locations in the physical memory that are between the first common boundary and the second common boundary across the devices; and
computing a first location address in the first subset when the address is within the first amount of the strided memory space and computing a second location address in the second subset when the address is within the remainder of the strided memory space.

2. The computer-implemented method of claim 1, wherein the processor is a multithreaded processor configured to perform simultaneous multiprocessing.

3. The computer-implemented method of claim 1, wherein the first subset of the locations includes an equal amount from each one of the devices.

4. The computer-implemented method of claim 1, wherein the second subset of the locations includes different amounts from at least two of the devices.

5. The computer-implemented method of claim 1, wherein the second subset of the locations are distributed between the third subset of the locations proportionally for the at least one partition memory space.

6. The computer-implemented method of claim 1, wherein the remainder of the strided memory space is mapped to the second subset of the locations according to a first format specified for the third subset of the locations.

7. The computer-implemented method of claim 6, wherein the computing comprises reordering bits of the first location address according to the first format.

8. The computer-implemented method of claim 6, wherein the computing comprises, according to the first format, applying a hash operation to bits of the first location address.

9. The computer-implemented method of claim 6, wherein the first amount of the strided memory space is mapped to the first subset of the locations according to a second format that is different than the first format.

10. The computer-implemented method of claim 1, wherein a first partition memory space of the at least one partition memory space is accessed only by a first client and a second partition memory space of the at least one partition memory space is accessed only by a second client.

11. The computer-implemented method of claim 1, wherein the devices include a first physical memory device that is allocated only to a first partition memory space of the at least one partition memory space and a second physical memory device that is allocated only to a second partition memory space of the at least one partition memory space.

12. The computer-implemented method of claim 1, wherein a first processing resource within the processor is allocated only to a first client associated with a partition memory space of the at least one partition memory space and a second processing resource within the processor is allocated only to a second client associated with a second partition memory space of the at least one partition memory space.

13. The computer-implemented method of claim 1, wherein a first cache resource within the processor is allocated only to a first client associated with a partition memory space of the at least one partition memory space and a second cache resource within the processor is allocated only to a second client associated with a second partition memory space of the at least one partition memory space.

14. The computer-implemented method of claim 1, wherein the first amount of the strided memory space is mapped to all locations contained entirely within the first subset of the locations, accounting for a format specified for the strided memory space and the number of the devices.

15. A system, comprising:
devices included in a physical memory;
a processor coupled to the devices and comprising an address mapping unit that is configured to:
receive an address for accessing an address space that is mapped to locations in a physical memory, wherein the address space is separated into a first portion corresponding to a strided memory space and a second portion corresponding to at least one partition memory space;
determine that the address is within the first portion, wherein
an amount of the first portion is mapped to a first subset of the locations in the physical memory that are aligned at a first common boundary across devices included in the physical memory,
a remainder of the first portion is mapped to a second subset of the locations in the physical memory that are aligned at a second common boundary and distributed across the devices, and
the second portion is mapped to a third subset of the locations in the physical memory that are between the first common boundary and the second common boundary across the devices; and
compute a first location address in the first subset when the address is within the amount of the first portion and computing a second location address in the second subset when the address is within the remainder of the first portion.

16. The system of claim 15, wherein the amount of the first portion is mapped to all locations contained entirely within the first subset of the locations, accounting for a format specified for the strided memory space and the number of the devices.

17. The system of claim 15, wherein the first subset of the locations includes an equal amount from each one of the devices.

18. The system of claim 15, wherein the second subset of the locations includes different amounts from at least two of the devices.

19. The system of claim 15, wherein the second subset of the locations are distributed between the third subset of the locations proportionally for the at least one partition memory space.

20. A non-transitory computer-readable media storing computer instructions that, when executed by one or more processors, cause the one or more processors to perform the steps of:
receiving an address for accessing an address space that is mapped to locations in physical memory associated with a processor, wherein the address space is separated into a first portion corresponding to a strided memory space and a second portion corresponding to at least one partition memory space;
determining that the address is within the first portion, wherein
an amount of the first portion is mapped to a first subset of the locations in the physical memory that are aligned at a first common boundary across devices included in the physical memory,
a remainder of the first portion is mapped to a second subset of the locations in the physical memory that are aligned at a second common boundary and distributed across the devices, and
the second portion is mapped to a third subset of the locations in the physical memory that are between the first common boundary and the second common boundary across the devices; and
computing a first location address in the first subset when the address is within the amount of the first portion and computing a second location address in the second subset when the address is within the remainder of the first portion.

21. A computer-implemented method, comprising:
receiving an address for accessing an address space that is mapped to locations in physical memory associated with a processor, wherein the address space is separated into a strided memory space that is distributed between memory devices comprising the physical memory and at least one partition memory space;
determining that the address is within the strided memory space;
mapping the address to a location in the physical memory that is allocated to a first partition memory space of the at least one partition memory space, wherein each partition memory space is distributed to an exclusive portion of the memory devices; and
accessing the location mapped to the address.

* * * * *